(12) United States Patent
Wojnowicz et al.

(10) Patent No.: US 11,106,790 B2
(45) Date of Patent: Aug. 31, 2021

(54) DIMENSIONALITY REDUCTION OF COMPUTER PROGRAMS

(71) Applicant: Cylance Inc., Irvine, CA (US)

(72) Inventors: Michael Wojnowicz, Irvine, CA (US); Dinh Huu Nguyen, Santa Ana, CA (US); Andrew Davis, Portland, OR (US); Glenn Chisholm, Irvine, CA (US); Matthew Wolff, Laguna Niguel, CA (US)

(73) Assignee: Cylance Inc., Irvine, CA (US)

( * ) Notice: Subject to any disclaimer, the term of this patent is extended or adjusted under 35 U.S.C. 154(b) by 333 days.

(21) Appl. No.: 16/095,314

(22) PCT Filed: Apr. 21, 2017

(86) PCT No.: PCT/US2017/028974
§ 371 (c)(1),
(2) Date: Oct. 19, 2018

(87) PCT Pub. No.: WO2017/185049
PCT Pub. Date: Oct. 26, 2017

(65) Prior Publication Data
US 2019/0138721 A1    May 9, 2019

Related U.S. Application Data

(60) Provisional application No. 62/326,608, filed on Apr. 22, 2016.

(51) Int. Cl.
*G06F 21/56* (2013.01)
*G06N 20/10* (2019.01)
(Continued)

(52) U.S. Cl.
CPC ............. *G06F 21/56* (2013.01); *G06F 17/16* (2013.01); *G06F 21/51* (2013.01); *G06F 21/554* (2013.01); *G06K 9/6218* (2013.01); *G06N 20/10* (2019.01)

(58) Field of Classification Search
CPC .......... G06F 21/56; G06F 17/16; G06F 21/51; G06F 21/554; G06N 20/10; G06K 9/6218
(Continued)

(56) References Cited

U.S. PATENT DOCUMENTS 10,579,794 B1 *  3/2020  Gates ..................... G06F 21/56
2006/0033927 A1 *  2/2006  Froggatt ................. G01J 9/04
                                                          356/484

(Continued)

FOREIGN PATENT DOCUMENTS

WO    2015/047431 A1    4/2015

OTHER PUBLICATIONS

Dahl, George E. et al., "Large-scale malware classification using random projections and neural networks," 2013 IEEE International Conference on Acoustics, Speech and Signal Processing (ICASSP); Vancouver, BC; May 26-31, 2013, Institute of Electrical and Electronics Engineers, Piscataway, NJ, US, May 26, 2013, pp. 3422-3426 [retrieved on Oct. 18, 2018].

(Continued)

*Primary Examiner* — Farid Homayounmehr
*Assistant Examiner* — Sanchit K Sarker
(74) *Attorney, Agent, or Firm* — Jones Day

(57) ABSTRACT

In one aspect, a computer-implemented method is disclosed. The computer-implemented method may include determining a sketch matrix that approximates a matrix representative of a reference dataset. The reference dataset may include at least one computer program having a predetermined classification. A reduced dimension representation of (Continued)

the reference dataset may be generated based at least on the sketch matrix. The reduced dimension representation may have a fewer quantity of features than the reference dataset. A target computer program may be classified based on the reduced dimension representation. The target computer program may be classified to determine whether the target computer program is malicious. Related systems and articles of manufacture, including computer program products, are also disclosed.

20 Claims, 8 Drawing Sheets

(51) Int. Cl.
*G06F 17/16* (2006.01)
*G06F 21/51* (2013.01)
*G06F 21/55* (2013.01)
*G06K 9/62* (2006.01)

(58) Field of Classification Search
USPC ............................................. 726/23
See application file for complete search history.

(56) References Cited

U.S. PATENT DOCUMENTS

| | | | |
|---|---|---|---|
| 2010/0202502 A1* | 8/2010 | Tong | H04B 7/0619 375/224 |
| 2010/0275262 A1* | 10/2010 | Anand | H04L 63/1416 726/23 |
| 2014/0280428 A1* | 9/2014 | Clarkson | G06F 17/16 708/607 |
| 2015/0180890 A1* | 6/2015 | Ronen | H04L 63/1416 726/23 |
| 2015/0213376 A1* | 7/2015 | Ideses | G06F 21/56 706/12 |
| 2016/0055124 A1* | 2/2016 | Galvin | G06F 17/16 707/741 |
| 2017/0250989 A1* | 8/2017 | Bhattacharya | G06F 21/6218 |
| 2019/0114319 A1* | 4/2019 | Tristan | G06F 40/284 |
| 2019/0138721 A1* | 5/2019 | Wojnowicz | G06F 21/51 |

OTHER PUBLICATIONS

Ponomarev, Stanislav et al., "Evaluation of Random Projection for Malware Classification," 2013 IEEE Seventh International Conference on Software Security and Reliability Companion, IEEE, Jun. 18, 2013, pp. 68-73, [retrieved on Oct. 18, 2018].

* cited by examiner

DIMENSIONALITY REDUCTION OF COMPUTER PROGRAMS

RELATED APPLICATIONS

This application is a national stage application, filed under 35 U.S.C. § 371, of International Application No. PCT/US2017/028974, filed Apr. 21, 2017, which claims priority to U.S. Provisional Application No. 62/326,608 entitled LARGE SAMPLE RANDOMIZED PRINCIPAL COMPONENT ANALYSIS and filed on Apr. 22, 2016, the disclosure of which are hereby fully incorporated by reference.

TECHNICAL FIELD

The subject matter disclosed herein relates generally to machine learning and more specifically to techniques for reducing the dimensionality of computer programs.

BACKGROUND

A computer program can exhibit a plurality of features. These features can include static characteristics of the computer program such as, for example, path, size, type, instruction sequences, character strings, binary strings, entropy measurements, code complexity measurements, and/or the like. Furthermore, these features can also include runtime behavior of the computer program such as, for example, anomalous behaviors, deceptive behaviors, destructive behaviors, data loss capabilities, data collection capabilities, and/or the like. The features of the computer program can be used in classifying the computer program as malicious or benign.

SUMMARY

Systems, methods, and articles of manufacture, including computer program products, are provided for malware classification. In some example embodiments, there is provided a method that includes: determining a sketch matrix that approximates a matrix representative of a reference dataset, the reference dataset including at least one computer program having a predetermined classification; generating, based at least on the sketch matrix, a reduced dimension representation of the reference dataset, the reduced dimension representation having a fewer quantity of features than the reference dataset; and classifying, based at least on the reduced dimension representation, a target computer program to determine whether the target computer program is malicious.

In some variations, one or more features disclosed herein including the following features can optionally be included in any feasible combination. The method may further include: determining, based at least on the sketch matrix, an approximation a subspace populated by the reference dataset; and generating, based at least on the approximation to the subspace, the reduced dimension representation of the reference dataset. The reduced dimension representation of the reference dataset may correspond to a mapping of the reference dataset onto the approximation of the subspace. The generating of the reduced dimension representation may include determining a basis for the approximation of the subspace. The basis may include at least one pair of non-orthonormal vectors. The method may further include orthonormalizing the basis for the approximation of the subspace. The basis may include one or more basis vectors that span the approximation of the subspace.

In some variations, the sketch matrix may be determined by at least applying, to the matrix representative of the reference dataset, a sketch operator. The sketch operator may be multiplying the matrix representative of the reference dataset with a random projection matrix, the random projection matrix being populated with one or more values selected from a normal distribution of values. The sketch operator may implement a feature hashing function. The sketch operator may implement a Monte Carlo sampling function. The determining of the sketch matrix may include: loading, into a main memory, a first portion of the matrix representative of the reference dataset; computing a partial product of the other matrix and the matrix representative of the reference dataset before loading, into the main memory, a second portion of the matrix representative of the reference dataset.

In some variations, at least some of the features in reference dataset may be merged to generate the reduced dimension representation of the reference dataset. The predetermined classification may include malicious, benign, a family of malware, and/or a type of malware. The features in the reference dataset may include a file path, a file size, a file type, an instruction sequence, a character string, a binary string, a code complexity measurement, an anomalous behavior, a deceptive behavior, a destructive behavior, a data loss capability, and/or a data collection capability.

In some variations, the classifying of the target computer program may include determining, based on the reduced dimension representation of the reference dataset, a measure of similarity between the target computer program and the reference dataset. The classifying of the target computer program may further include determining, based on the measure of similarity, whether the target computer program should be assigned a same classification as the one or more computer programs in the reference dataset.

Implementations of the current subject matter may further include systems and articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The features of a computer program may be used to classify the computer program. For example, the features of the computer program, such as static characteristics and/or runtime behaviors, may be compared to the features of other computer programs that have already been classified as malicious and/or benign. Alternately and/or additionally, the computer program may be compared to other computer programs that have already been classified as a specific type of malware such as, for example, adware, ransomware, bot, bug, rootkit, spyware, Trojan horse, virus, worm, and/or the like. Although features are useful to enable classification a computer program, the computer program may be associated with hundreds of thousands of features. As such, a high-dimensional feature space may be required to represent these features in a manner that enables a comparison of different computer programs. However, analysis of this high-dimensional feature space may be overly burdensome with respect to time and computational resources.

In some example embodiments, an approximate dimensionality reduction technique may be applied in order to reduce the dimensionality of a reference dataset containing a plurality of computer programs. The approximate dimensionality reduction technique may be applied instead of a conventional dimensionality reduction technique, such as singular value decomposition (SVD), as conventional dimensionality reduction techniques may be computationally impractical when applied to a reference dataset containing a large quantity of computer programs. As used herein, the dimensionality of a reference dataset may correspond to a quantity of features used to represent each computer program in the reference dataset. Accordingly, applying the approximate dimensionality reduction technique may reduce the dimensionality of the reference dataset by at least identifying one or more approximate principal components. The approximate principal components may be uncorrelated features that may be used to represent the computer programs in the reference dataset. Analysis of the reference dataset may be performed with respect to the reduced dimension representation of the reference dataset instead of the original high-dimensional representation of the reference dataset.

Figure 1:
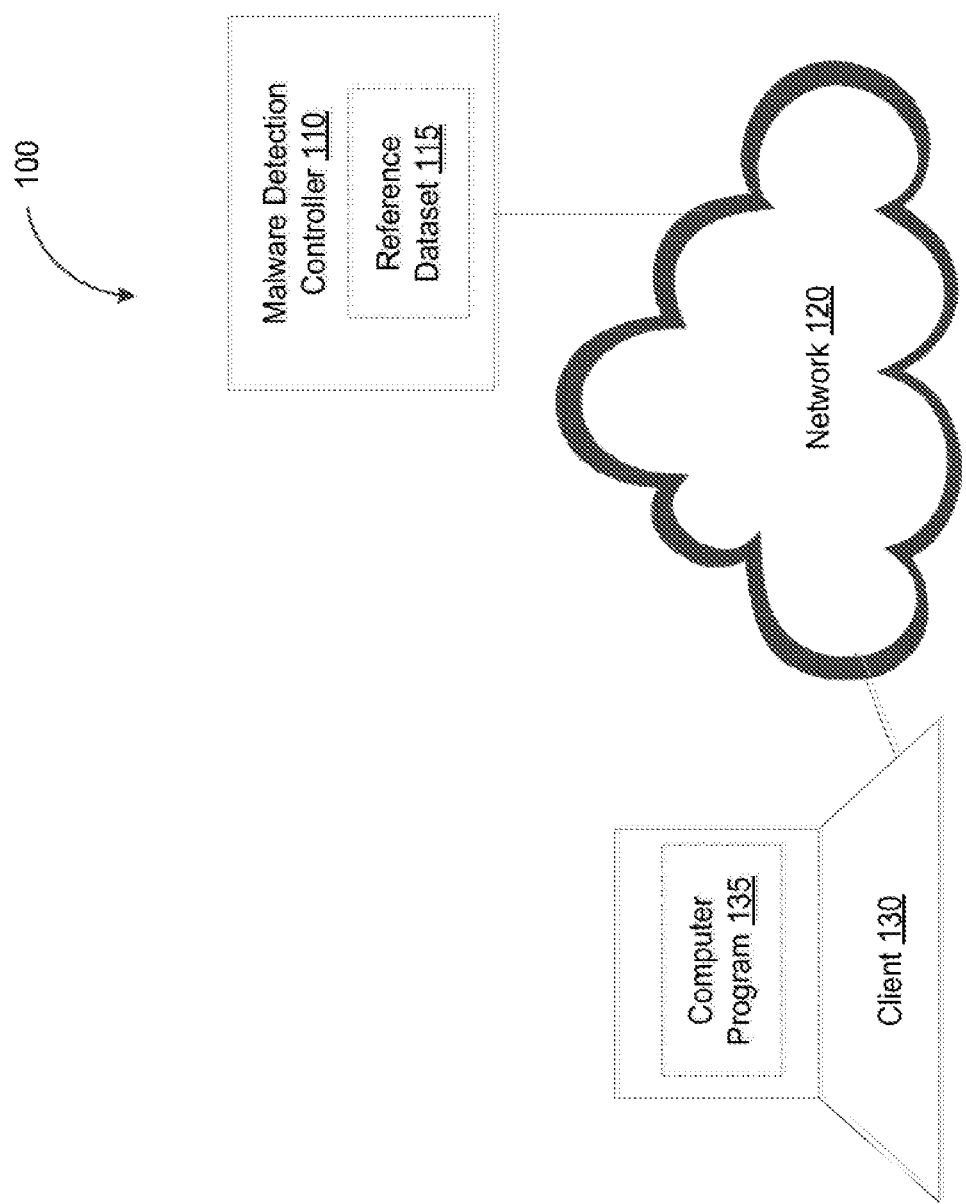
FIG. 1 depicts a system diagram illustrating a malware detection system, in accordance with some example embodiments.

FIG. 1 depicts a system diagram illustrating a malware detection system 100, in accordance with some example embodiments. Referring to FIG. 1, the malware detection system 100 may include a malware detection controller 110 that is communicatively coupled with a client 130 via at least one wired and/or wireless network 120. The network 120 may be the Internet, a public land mobile network, a local area network (WLAN), a wide area network (WAN), a point-to-point link, and/or the like. The client 130 may be, for example, a computer, a tablet, a mobile device, a smart phone, and/or any other device including at least one processor and at least one memory including program code.

As shown in FIG. 1, the malware detection controller 110 can communicate with the client 130. The malware detection controller 110 may be configured to provide one or more functionalities including, for example, malware detection. In some example embodiments, the functionalities of the malware detection controller 110 may be accessed remotely, for example, via the network 120. However, it should be appreciated that the malware detection controller 110 may also be deployed at the client device 130 as computer software and/or dedicated circuitry (e.g., application specific integrated circuits (ASICs)).

The malware detection controller 110 may classify a computer program 135 that is detected at the client 130 as malicious or benign. Alternately and/or additionally, the malware detection controller 110 may classify the computer program 135 as being a specific family and/or type of malware such as, for example, an adware, a ransomware, a bot, a bug, a rootkit, a spyware, a Trojan horse, a virus, a worm, and/or the like. The malware detection controller 110 may classify the computer program 135 based on a reference dataset 115, which may be maintained at the malware detection controller 110. For example, the computer program 135 may be classified by at least comparing the features of the computer program 135 to the features of computer programs in the reference dataset 115. As used herein, a computer program, such as the computer program 135 and/or the computer programs in the reference dataset 115, may be any form of instructions and/or program code that provide operations when executed by one or more processors. It should be appreciated that the computer program may be in any programming language and may be executed with and/or without compilation.

The reference dataset 115 may be represented based on the features of the computer programs in the reference dataset 115. For example, the reference dataset 115 may include a m quantity of computer programs. Moreover, each of the m quantity of computer programs in the reference dataset 115 may be associated with a n quantity of features. As such, the reference dataset 115 may be represented as an m×n matrix X, wherein $X \in R^{m \times n}$. It should be appreciated that each element in the matrix X may correspond to a value, such as a numerical representation, for one of the n quantity of features that is present in one of the m quantity of computer programs in the reference dataset 115. For instance, each of the m quantity of computer programs in the reference dataset 115 may be represented by an average entropy of the computer program, a quantity of suspicious strings in the computer program, a logarithm of a quantity of suspicious stings in the computer program, a quantity of sections in the computer program that are both executable and writable, and/or a logarithm of a quantity of executable and writable sections in the computer program. However, any feature may be used to represent, a computer program including, for example, file path, file size, file type, instruction sequences, character strings, binary strings, code complexity measurements, anomalous behaviors, deceptive behaviors, destructive behaviors, data loss capabilities, data collection capabilities, and/or the like.

The matrix X may provide a n-dimensional representation of the reference dataset 115. That is, the reference dataset 115 may initially be represented as a set of m data points in a n-dimensional feature space. However, these m data points may not be scattered across the entire n-dimensional feature space but may instead be concentrated approximately around a lower r-dimensional subspace within the n-dimensional feature space. As such, the malware detection controller 110 may be configured to reduce the dimensionality of the reference dataset 115 by at least determining, within the n-dimensional feature space, an approximation of the r-dimensional subspace that is actually occupied by the m data points forming the reference dataset 115. In doing so, the malware detection controller 110 may determine a r quantity of features from the n quantity of features that are being used to represent the reference dataset 115. This r quantity of features may be a function of the original n quantity of features used to represent the reference dataset 115. For example, this r quantity of features may be derived from the n quantity of features by merging at least some of the n quantity of features.

Figure 2:
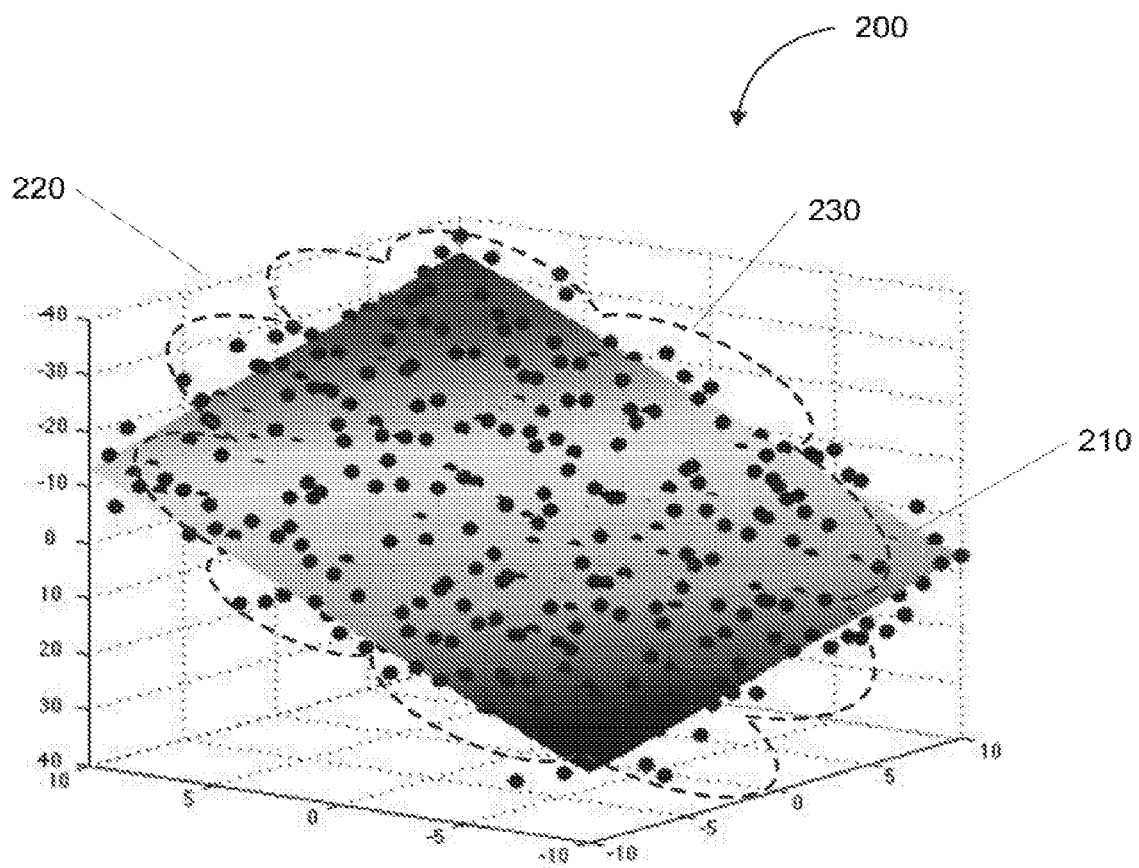
FIG. 2 depicts a graph illustrating a subspace within a feature space, in accordance with some example embodiments.

To further illustrate, FIG. 2 depicts a graph 200 illustrating a subspace 210 within a feature space 220, in accordance with some example embodiments. The feature space 220 may be a 3-dimensional feature space that represents the computer programs in the reference dataset 115 based on three features such as, for example, average entropy, a quantity of suspicious strings, and/or a quantity of executable and writable sections. Specifically, the m quantity of computer programs in the reference dataset 115 may be represented by a point cloud 230 inhabiting the feature space 220. The point cloud 230 may include a plurality of data points corresponding to the m quantity of computer programs in the reference dataset 115. Each data point in the point cloud 230 may have three coordinates such as, for example, an x-coordinate, a y-coordinate, and an z-coordinate, for the three features used to represent a corresponding computer program.

As shown in FIG. 2, the data points in the point cloud 230 may not be distributed across the entire 3-dimensional feature space 220. Instead, the data points in the point cloud 230 may be concentrated over the subspace 210, which may be a 2-dimensional hyperplane within the 3-dimensional feature space 220. The axes of the 2-dimensional subspace 210 may correspond to the approximate right singular vectors of the reference dataset 115. The approximate right singular vectors of the reference dataset 115 may be two uncorrelated features derived from the reference dataset 115. The approximate right singular vectors of the reference dataset 115 may be used to represent the reference dataset 115 in the 2-dimensional subspace 210. As such, the data points in the point cloud 230 may be approximately represented using two coordinates in the 2-dimensional subspace 210 instead of the three coordinates that are required to represent the data points in the 3-dimensional feature space 220. A 2-dimensional representation of the reference dataset 115 may be used to classify a computer program such as, for example, the computer program 135. It should be appreciated that classifying the computer program 135 based on the 2-dimensional representation of the reference dataset 115 may be more computationally efficient than classifying the computer program 135 based on the original 3-dimensional representation of the reference dataset 115. Accordingly, the malware detection controller 110 may apply an approximate dimensionality reduction technique in order to determine an approximation of the 2-dimensional subspace 210. It should be appreciated that the approximation using right singular vectors instead of an exact computation may be necessary when reducing the dimensionality of a reference dataset containing a large quantity of computer programs.

The malware detection controller 110 may determine an approximation of the r-dimensional subspace, such as the 2-dimensional subspace 210, by at least determining a matrix B based applying a random sketching operator S to the matrix X. The rows of the matrix B may span the approximate r-dimensional subspace. For example, the matrix B may be determined in accordance with the following equation (1):

$$B=(X^{t}S(s))^{t}=(X^{t}X\Omega)^{t}=\Omega^{t}X^{t}X \qquad (1)$$

wherein X is the m×n matrix X representative of the reference dataset 115 and $X^{t}$ is a transpose of the matrix X in which the elements from the matrix X are flipped along a diagonal of the matrix X. Meanwhile, the matrix Ω may be a n×r random projection matrix. The elements of the random projection matrix Ω may be random and/or pseudo-random numbers. For example, the random projection matrix Ω may be generated by populating the random projection matrix Ω with independent and identically distributed values selected from a normal (e.g., Gaussian) distribution of values. Alternately and/or additionally, the random projection matrix Ω may be generated by random selection from the set {−1,0,1}. However, it should be appreciated that the random projection matrix Ω may be generated in any manner. Alternately and/or additionally, the sketching operator S may implement a feature hashing function and/or a Monte Carlo sampling function. It should be appreciated that the resulting matrix B may be a r×n matrix, wherein $B \in \mathbb{R}^{k \times n}$.

In some example embodiments, the malware detection controller 110 may determine the matrix B, which has rows that span the reduced r-dimensional subspace, without any orthonormalization. However, it should be appreciated that the malware detection controller 110 may determine the matrix B in a manner that generates an orthonormal matrix. For example, the matrix B may be determined by pre-multiplying the matrix X with the transpose of a matrix Q, which may be an orthonormal matrix. The matrix Q may be formed by decomposing a product of the matrix X and the random projection matrix Ω, although the matrix Q can be generated using other techniques as well. As used herein, a matrix is orthonormal when all of the columns in the matrix form mutually orthogonal unit vectors.

The size of the matrix X as well the corresponding transposed matrix $X^{t}$ may be sufficiently large to prevent the matrices from being loaded as a whole into a main memory of the malware detection controller 110. As such, in some example embodiments, the determination of the matrix B may be performed out-of-core. That is, the matrix multiplication required to determine the matrix B may be performed on individual portions of the matrices X and $X^{t}$, with only portions of the matrices X and $X^{t}$ being loaded at any one time into the main memory of the malware detection controller 110. Alternately and/or additionally, the determination of the matrix B may be performed in a distributed manner. For example, the matrix multiplication required to determine the matrix B may be performed by a plurality of processors, with portions of the matrices X and $X^t$ being distributed across a corresponding plurality of main memories.

The malware detection controller 110 may be further configured to determine, based on the basis encoded by the matrix B, a more refined basis of the approximate r-dimensional subspace, such as the 2-dimensional subspace 210, occupied by the reference dataset 115. The basis of the approximate r-dimensional subspace may include a set of basis vectors that span the approximate r-dimensional subspace. These basis vectors may form the columns of a matrix V. It should be appreciated that by spanning the r-dimensional subspace, every data point in the r-dimensional subspace may be represented as a vector that is a linear combination of the basis vectors. For instance, referring again to FIG. 2, every data point in the point cloud 230 may be represented as a corresponding vector $\vec{v}$. Each vector $\vec{v}$ may be derived, in accordance with Equation (2) below, from a linear combination of the basis vectors $\hat{i}$ and $\hat{j}$ spanning the 2-dimensional subspace 210.

$$\vec{v} = v_x \hat{i} + v_y \hat{j} \quad (2)$$

wherein $\hat{i}$ and $\hat{j}$ may be vectors lying within the 2-dimensional subspace 210, and $v_x$ and $v_y$ are the corresponding scalars. It should be appreciated that $\hat{i}$ and $\hat{j}$ may be linearly independent such that neither $\hat{i}$ nor $\hat{j}$ is a linear combination of the other vector. For a fixed subspace, there may be multiple bases. Here, the matrix V may encode a potentially more useful basis than the matrix B by performing operations such as normalization, orthonormalization, or orthonormalization with alignment to singular vectors. For example, the matrix V can be obtained through the following equation (3):

$$U, D, V^t = svd(B) \quad (3)$$

The malware detection controller 110 may be configured to classify the computer program 135 based on the reduced r-dimensional representation of the reference dataset 115 instead of the original n-dimensional representation of the reference dataset 115. The reduced r-dimensional representation may be expressed as a product of the matrix X, which provides the original higher n-dimensional representation of the reference dataset 115, and the matrix V, whose columns are the basis vectors of the reduced r-dimensional subspace. It should be appreciated that multiplying the matrix X and the matrix V may generate a representation of the m quantity of data points on the approximate r-dimensional subspace. This m quantity of data points may be re-represented within the r-dimensional subspace based on a r quantity of features.

In some example embodiments, when the size of the matrix X is sufficiently large to prevent the matrix from being loaded as a whole into the main memory of the malware detection controller 110, the multiplication of the matrix X and the matrix V may be performed in an out-of-core fashion, with only portions of the matrix X being loaded at any one time into the main memory of the malware detection controller 110. Alternately and/or additionally, the multiplication of the matrix X and the matrix V may be performed in a distributed manner, with the matrix multiplication being performed on portions of the matrix X by a plurality of processors.

In some example embodiments, the malware detection controller 110 may compare the computer program 135 to the reference dataset 115 by at least determining a measure of similarity between the computer program 135 and the reduced r-dimensional representation of the reference dataset 115. This measure of similarity may indicate whether the computer program 135 should be assigned a similar and/or a same classification (e.g., malicious, benign, a specific type or family of malware, and/or the like) as the computer programs in the reference dataset 115.

Figure 3:
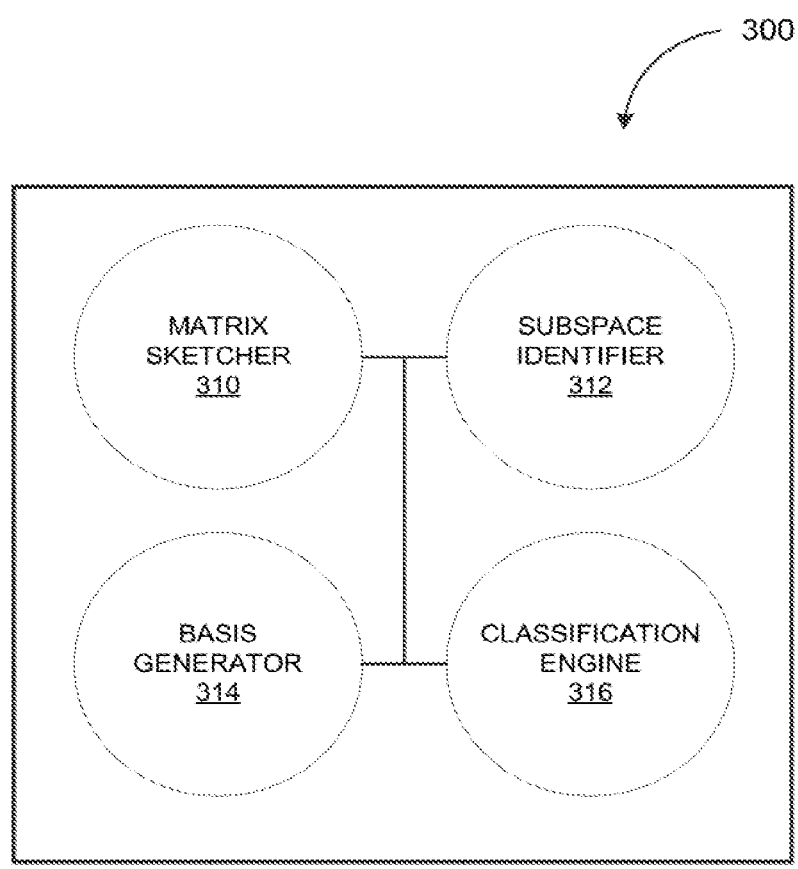
FIG. 3 depicts a block diagram illustrating a malware detection controller, in accordance with some example embodiments.

FIG. 3 depicts a block diagram illustrating the malware detection controller 110, in accordance with some example embodiments. Referring to FIG. 3, the malware detection controller 110 may include a matrix sketcher 310, a subspace identifier 312, a basis generator 314, and a classification engine 316. It should be appreciated that the malware detection controller 110 may include additional and/or different components than those shown in FIG. 3.

The matrix sketcher 310 may be configured to determine a preliminary reduced dimension representation of a reference dataset, such as the reference dataset 115. The reduced dimension representation of the reference dataset may preserve the distances between the data points in the reference dataset. In some example embodiments, the matrix sketcher 310 may generate the reduced dimension representation of the reference dataset 115 by at least generating a m×E matrix Y that is a sketch of the original m×n matrix X. That is, the reduced dimension representation of the reference dataset 115 may be generated by sketching the matrix X. The matrix sketcher 310 may sketch the matrix X using one or more different techniques including, for example, random projections, feature hashing, Monte Carlo sampling, and/or the like. As used herein, the sketch of a matrix may be another matrix that approximates the original matrix and is significantly smaller than the original matrix. Thus, the matrix Y may be significantly smaller than the matrix X while still providing an approximation of the matrix X.

As one example, the matrix sketcher 310 may sketch the matrix X by at least applying a random projection matrix, such as the random projection matrix Ω, to the matrix X. The random projection matrix Ω may be a matrix that is populated by random numbers. For instance, the random projection matrix Ω may be populated with independent and identically distributed values selected from a normal (e.g., Gaussian) distribution of values. Alternately and/or additionally, the matrix sketcher 310 may sketch the matrix X by at least applying, to the matrix X, a feature hashing function and/or a Monte Carlo sampling function.

The subspace identifier 312 may be configured to determine an approximation of a lower dimensional subspace occupied by a reference dataset, such as the reference dataset 115. The reference dataset 115 may include a m quantity of computer programs that are each associated with a n quantity of features. As such, the reference dataset 115 may initially be represented as a m×n matrix X, which corresponds to a m quantity of data points occupying a n-dimensional feature space. However, these m quantity of data points may not be scattered across the entire n-dimensional feature space but may instead be concentrated over a lower r-dimensional subspace within the n-dimensional feature space. Accordingly, in some example embodiments, the subspace identifier 312 may be configured to determine an approximation of the reduced r-dimensional subspace by at least determining a matrix B. The matrix B may be determined based at least on the sketch matrix. The rows of this matrix B may approximately span the reduced r-dimensional subspace actually occupied by the m quantity of data points in the reference dataset 115.

The basis generator 314 may be configured to determine a refined set of basis vectors that span the approximate lower dimensional subspace occupied by a reference dataset, such as the reference dataset 115. These basis vectors may provide, for example, an orthonormal basis and/or an approximately orthonormal basis. For example, the basis vectors of the approximate r-dimensional subspace may span the r-dimensional subspace because every data point within the r-dimensional subspace may be represented as a linear combination of these basis vectors. Moreover, the basis vectors for the approximate r-dimensional subspace may form the columns of a matrix V. As such, the reduced dimension representation of the reference dataset 115 may be expressed as XV. That is, the reduced dimension representation of the reference dataset 115 may be a product of the matrix X, which provides the original n-dimensional representation of the reference dataset 115, and the matrix V, which contains the basis vectors of the r-dimensional subspace.

In some example embodiments, the classification engine 316 may be configured to classify a computer program, such as the computer program 135, by comparison to a reference dataset, such as the reference dataset 115. For example, the malware detection controller 110 may compare the computer program 135 to the reference dataset 115 by at least determining a measure of similarity between the computer program 135 and the r-dimensional representation of the reference dataset 115. The computer program 135 may be assigned a similar and/or a same classification as the computer programs in the reference dataset 115 if the measure of similarity between the computer program 135 and the reference dataset 115 is high. By contrast, the computer program 135 may be assigned a different classification as the computer programs in the reference dataset 115 if the measure of similarity between the computer program 135 and the reference dataset 115 is low.

Figure 4A:
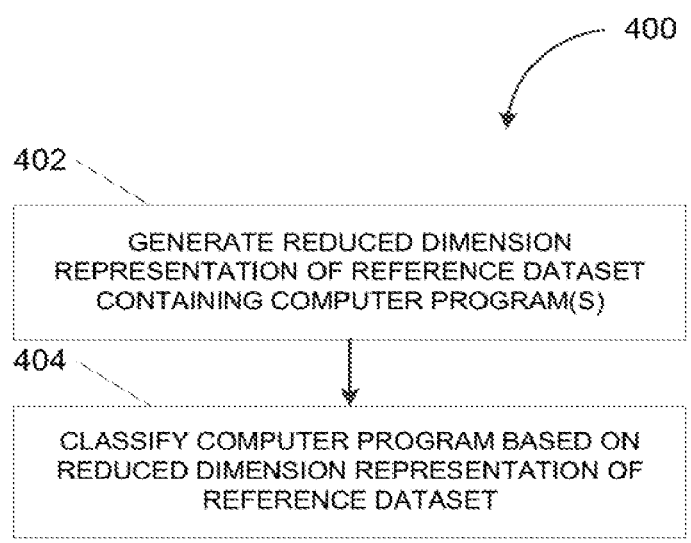
FIG. 4A depicts a flowchart illustrating a process for classifying a computer program, in accordance with some example embodiments.

FIG. 4A depicts a flowchart illustrating a process 400 for classifying a computer program, in accordance with some example embodiments. Referring to FIGS. 1-4A, the process 400 may be performed by the malware detection controller 110.

At 402, the malware detection controller 110 may generate a reduced dimension representation of a reference dataset containing one or more computer programs. In some example embodiments, the malware detection controller 110 may reduce the dimensionality of the reference dataset 115 from a n-dimensional feature space to a lower, reduced r-dimensional subspace. For example, the reference dataset 115 may include a m quantity of computer programs that are each associated with a n quantity of features. As such, the reference dataset 135 may initially be represented as a m×n matrix X, which corresponds to a set of m data points in a n-dimensional feature space. However, these m data points may not be densely distributed across the entire n-dimensional feature space. Moreover, analyzing the reference dataset 115 with respect to this n-dimensional feature space may impose excessive computation overhead. Thus, the malware detection controller 110 may apply an approximate dimensionality reduction technique to reduce the dimensionality of the reference dataset 115 from the n-dimensional feature space to a lower, reduced r-dimensional subspace. In doing so, the malware detection controller 110 may generate a lower, reduced r-dimensional representation of the reference dataset 115. As noted above, the lower, reduced r-dimensional representation of the reference dataset 115 may be approximated by the matrix V.

At 404, the malware detection controller 110 may classify a computer program based on the reduced dimension representation of the reference dataset. For example, the malware detection controller 110 may classify the computer program 135 by comparing the computer program 135 to the reduced r-dimensional representation of the reference dataset 115. Comparing the computer program 135 to the r-dimensional representation of the reference dataset 115 may include determining a measure of similarity between the computer program 135 and the r-dimensional representation of the reference dataset 115. The malware detection controller 110 may determine, based on this measure of similarity, whether to assign the computer program 135 a similar and/or a same classification (e.g., malicious, benign, a specific type or family of malware, and/or the like) as the computer programs in the reference dataset 115.

Figure 4B:
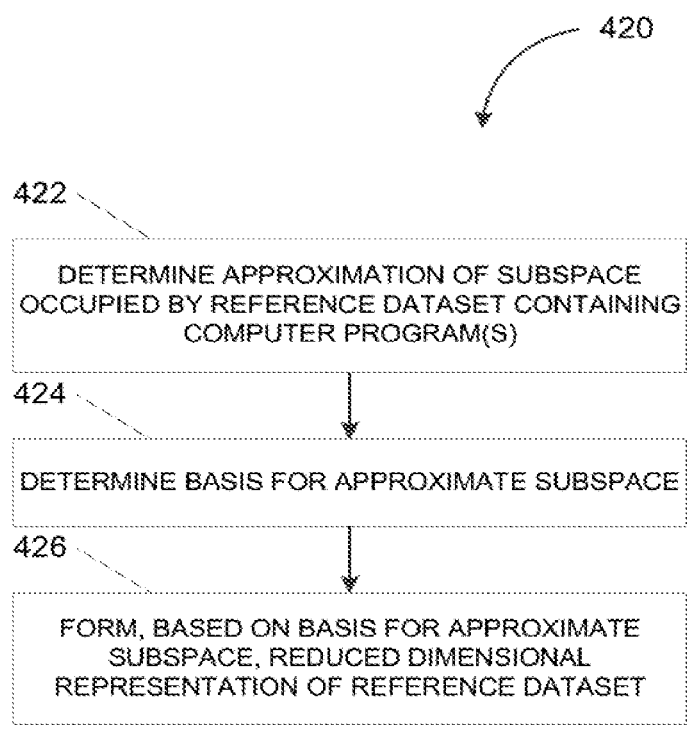
FIG. 4B depicts a flowchart illustrating a process for generating a reduced dimension representation of a reference dataset, in accordance with some example embodiments.

FIG. 4B depicts a flowchart illustrating a process 420 for generating a reduced dimension representation of a reference dataset, in accordance with some example embodiments. Referring to FIGS. 1-3 and 4A-B, the process 420 may be performed by the malware detection controller 110 and may implement operation 402 of the process 400.

At 422, the malware detection controller 110 may determine an approximation of a subspace occupied by a reference dataset that contains one or more computer programs. In some example embodiments, the malware detection controller 110 may apply an approximate dimensionality reduction technique to reduce the dimensionality of the reference dataset 115 from a high n-dimensional feature space to a lower r-dimensional subspace. The approximate dimensionality reduction technique may be configured to determine an approximation of the r-dimensional subspace by at least computing a matrix B based on a random sketch Y formed from the matrix X. As set forth in Equation (1), the matrix B may a product of the matrix X, the transpose matrix $X^t$ of the matrix X, and the transpose matrix $\Omega^t$ of the random projection matrix $\Omega$. It should be appreciated that the malware detection controller 110 may determine the matrix B without any orthonormalization.

At 424, the malware detection controller 110 may determine a basis for the approximate subspace. For example, the malware detection controller 110 may determine the basis vectors that form the basis of the approximate r-dimensional subspace actually occupied by the m data points in the reference dataset 115. These basis vectors may be, for example, unit vectors that span the approximate r-dimensional subspace. It should be appreciated that the basis vectors may span the approximate r-dimensional subspace because every one of the m data points occupying the approximate r-dimensional subspace may be represented as vector derived from a linear combination of these basis vectors. Furthermore, these basis vectors may or may not be normalized and/or mutually orthogonal.

In some example embodiments, the malware detection controller 110 may determine the basis for the approximate subspace by applying, to the matrix B, QR decomposition and/or singular value decomposition. Application of QR decomposition and/or singular value decomposition may generate an orthonormal basis in which all of the constituent basis vectors are unit normalized and mutually orthogonal. Alternately and/or additionally, the basis for the approximate subspace may be determined by more generally normalizing the vectors formed by the rows of the matrix B to at least reduce the magnitudes of these vectors while leaving the directionality of the vectors unchanged. The resulting basis vectors may be normalized but not mutually orthogonal. It should be appreciated that the basis of the approximate subspace may also be approximated by the transpose matrix $B^t$ of the matrix B without any further processing.

At 426, the malware detection controller 110 may form, based on the basis for the approximate subspace, a reduced dimension representation of the reference dataset. In some example embodiments, the basis for the approximate r-dimensional subspace may be encoded within the matrix V. In particular, the columns of the matrix V may correspond to the basis vectors that span the approximate r-dimensional subspace. As noted earlier, the matrix V may be a duplicate of the transpose matrix $B^t$ of the matrix B, in which case the basis for the approximate subspace may not be orthonormal. However, the matrix V may also be formed by applying QR decomposition to the matrix $B^t$ and/or singular value decomposition to the matrix B to generate a set of orthonormal basis vectors. Alternately and/or additionally, the matrix V may be formed by normalizing the vectors formed by the rows of the matrix B to generate a set of normalized but not necessarily mutually orthogonal basis vectors.

In some example embodiments, the reduced dimension representation of the reference dataset 115 may be formed based on the matrix V and the matrix X, which provides the original n-dimensional representation of the reference dataset 115. For example, the reduced dimension representation of the reference dataset 115 may be a product of multiplying the matrix V and the matrix X. Multiplying the matrix V and the matrix X may re-represent the reference dataset 115 with respect to the r-dimensional subspace by at least projecting the m quantity of data points in the reference dataset 115 onto the approximate r-dimensional subspace.

Figure 4C:
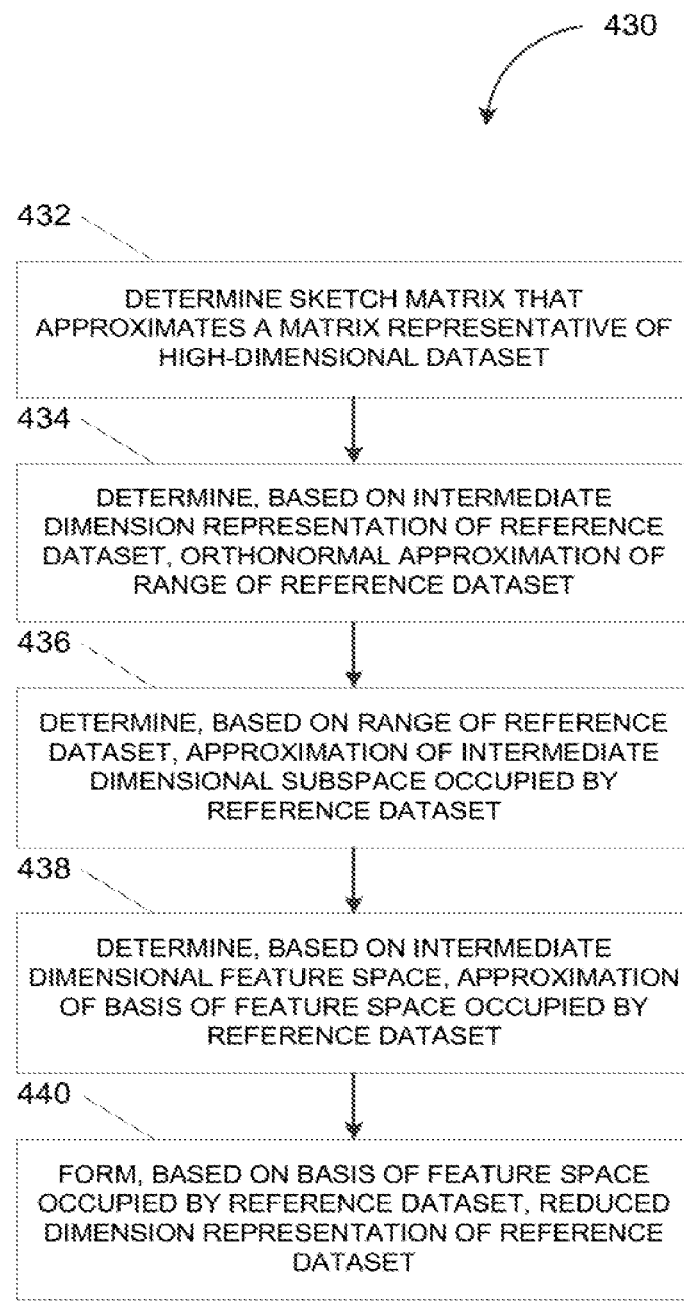
FIG. 4C depicts a flowchart illustrating a process for generating a reduced dimension representation of a reference dataset, in accordance with some example embodiments.

FIG. 4C depicts a flowchart illustrating a process 430 for generating a reduced dimension representation of a reference dataset, in accordance with some example embodiments. Referring to FIGS. 1-3, 4A, and 4C, the process 430 may be performed by the malware detection controller 110 and may provide an alternate implementation of operation 402 of the process 400.

At 432, the malware detection controller 110 may determine a sketch matrix that approximates a matrix representative of a high-dimensional reference dataset. For instance, the malware detection controller 110 may sketch the matrix X, which provides the original higher n-dimensional representation of the reference dataset 115, using random projections, feature hashing, and/or Monte Carlo sampling. Meanwhile, the resulting sketch matrix Y may be smaller matrix than the matrix X that still approximates the matrix X. For example, the sketch matrix Y may provide an intermediate representation of the reference dataset 115.

For example, the malware detection controller 110 may sketch the matrix X by applying the random projection matrix Ω to the matrix X. That is, the malware detection controller 110 may generate the matrix Y in accordance with the following Equation (4). As set forth in Equation (4), the matrix Y be a product of the matrix X, which is representative of the reference dataset 115 in a n-dimensional feature space, and the random projection matrix Ω.

$$Y = X\Omega \qquad (4)$$

As noted earlier, the random projection matrix Ω may be a n×E matrix populated with independent and identically distributed values selected from a standard normal (e.g., Gaussian) distribution of values. Alternately and/or additionally, the random projection matrix U may be formed by constructing a subsampled randomized Hadamard transformation. The random projection matrix Ω may also be formed by random selection from the set {−1, 0, 1} with predetermined probabilities. This random projection matrix Ω may have a n quantity of rows corresponding to the n quantity of features associated with the computer programs in the reference dataset 115. Moreover, the random projection matrix Ω may have an E quantity of columns corresponding to an intermediate dimensionality E. It should be appreciated that the intermediate dimensionality E is a lower dimensionality than the initial n-dimensionality of the reference dataset 115. However, the intermediate dimensionality E may still be greater than the target reduced dimensionality of r.

At 434, the malware detection controller 110 may determine, based on the intermediate dimension representation of the reference dataset, an orthonormal approximation of a range of the reference dataset. As noted earlier, the computer programs in the reference dataset 115 may be represented as the m×n matrix X. The range of the reference dataset 115 may refer to all of the possible linear combinations of the vectors formed by the columns of the matrix X. In some example embodiments, the malware detection controller 110 may determine an orthonormal matrix Q that approximates the range of the reference dataset 115. This orthonormal matrix Q may be determined by at least performing a QR decomposition on the matrix Y, which represents the reference dataset 115 in the intermediate E-dimensional feature space. The QR decomposition of the matrix Y may be expressed in terms of the following Equation (5).

$$QR = Y \qquad (5)$$

When expressed in a reduced or a compact form, the matrix $Q \in \mathbb{R}^{m \times E}$ is an m×E matrix with E orthonormal columns. Meanwhile, matrix R may be an E×E upper triangular matrix in which all elements below a diagonal of the matrix R have a value of zero. It should be appreciated that discarding the zero-filled bottom rows of the matrix R may result in a reduced or compact matrix Q.

At 436, the malware detection controller 110 may determine, based on the range of the reference dataset, an approximation of an intermediate dimensional feature space occupied by the reference dataset. In some example embodiments, the malware detection controller 110 may determine an E×n matrix B, which approximates via the span of its rows, the intermediate E-dimensional feature space occupied by the reference dataset 115. The matrix B may be formed based on the orthonormal matrix Q and the matrix X representative of the reference dataset 115 in the original n-dimensional feature space. For instance, as set forth in Equation (6) below, the matrix B may a product of a transpose of the orthonormal matrix $Q^T$ and the matrix X.

$$B = Q^T X \qquad (6)$$

At 438, the malware detection controller 110 may determine, based on the intermediate dimensional feature space, an approximation of the basis of the feature space occupied by the reference dataset. The basis for the n-dimensional feature space occupied by the reference dataset 115 may be determined by performing singular value decomposition with respect to the matrix X. However, singular value decomposition of the matrix X with a high dimension n may be computationally intractable. As such, in some example embodiments, the malware detection controller 110 may approximate the singular value decomposition of the matrix X via a singular value decomposition of the matrix B. For example, performing singular value decomposition on the matrix B may factorize the matrix B into the matrices $\tilde{U}$, $\Sigma$, and $V^T$. Equation (7) below expresses the singular value decomposition of the matrix B as a product of the matrices $\tilde{U}$, $\Sigma$, and $V^T$.

$$B = \tilde{U} \Sigma V^T \quad (7)$$

wherein the matrix $V^T$ may be a E×n matrix that is a transpose of the matrix V whose columns form the basis vectors of the E-dimensional feature space. It should be appreciated that the matrix V may have an E number of columns corresponding to the E number of basis vectors that define the E-dimensional feature space.

Meanwhile, the singular value decomposition of the matrix X may be approximated, in accordance with the following equation (8), based on the orthonormal matrix Q.

$$X \approx QQ^T X \quad (8)$$

wherein the orthonormal matrix Q is an E×m matrix having E orthonormal rows and the corresponding transpose matrix $Q^T$ is an m×E matrix.

Equation (9) below further illustrates how the singular value decomposition of the matrix X may be approximated based on the singular value decomposition of the matrix B. As set forth in Equation (9), the singular value decomposition of the matrix X may be approximated as a product of the orthonormal matrix Q and the singular value decomposition of the matrix B, which is a product of the matrices $\tilde{U}$, $\Sigma$, and $V^T$.

$$X \approx QQ^T X = QB = Q(\tilde{U} \Sigma V^T) := U \Sigma V^T \quad (9)$$

At 440, the malware detection controller 110 may form, based on the basis of the feature space occupied by the reference dataset, a reduced dimension representation of the reference dataset. In some example embodiments, the reduced r-dimensional representation of the reference dataset 115 may correspond to a matrix $X^{reduced}$ that maps the matrix X into the lower r-dimensional subspace. This r-dimensional subspace may be defined, in accordance with the following Equation (10), as a product of the matrix X and a matrix $V_r$.

$$X^{reduced} = XV_r \quad (10)$$

wherein the matrix $V_r$ is formed by truncating the matrix V column-wise from an E number of columns to a r number of columns that correspond to the r dimensions of the reduced r-dimensional subspace.

Figure 4D:
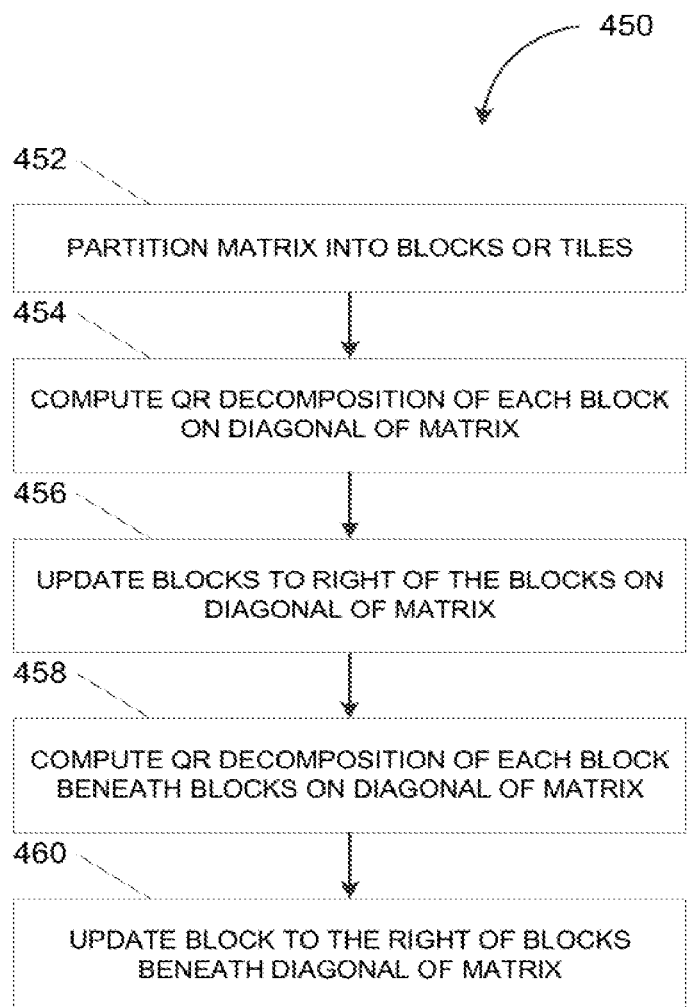
FIG. 4D depicts a flowchart illustrating a process for out-of-core matrix decomposition, in accordance with some example embodiments.

FIG. 4D depicts a flowchart illustrating a process 450 for out-of-core matrix decomposition, in accordance with some example embodiments. Referring to FIGS. 1-3 and 4C-D, the process 450 may be performed by the malware detection controller 110 and may implement operation 436 of the process 430. In some example embodiments, the QR decomposition of a matrix, such as the matrix Y, may be performed out-of-core because the matrix may be too large to be loaded into the main memory of the malware detection controller 110 as a whole. As noted earlier, performing a reduced QR decomposition on the matrix Y may factorize the m×E matrix Y into an m×E matrix Q having E orthonormal columns and an E×E upper triangular matrix R. In some example embodiments, the upper triangular matrix R may be constructed iteratively in order to enable the QR decomposition of the matrix Y to be performed in an out-of-core manner, wherein the matrix Y are loaded into a main memory of malware detection controller 110 only a portion at a time.

At 452, the malware detection controller 110 may partition a matrix into blocks or tiles. For example, the malware detection controller 110 may partition the matrix Y into a set of blocks $Y = Y_{ij}$, wherein $Y_{ij}$ may denote the (i,j)th block of the matrix Y and wherein the (i,j)th block has a size of $M_{ij} \times N_{ij}$. In some example embodiments, the malware detection controller 110 may partition the matrix Y such that the blocks along a diagonal of the matrix Y have a relatively greater number of rows than columns. That is, for each block $Y_{kk}$ of the matrix Y where k=i=j, the height $M_{kk}$ of the block may be greater than the width $N_{kk}$ of the block.

At 454, the malware detection controller 110 may compute a QR decomposition of each block on a diagonal of the matrix. For example, the malware detection controller 110 may compute the QR decomposition of the matrix Y by computing the QR decomposition of the block $Y_{kk}$ along the diagonal of the matrix Y such as, for example, the blocks $Y_{11}$, $Y_{22}$, and so forth. The QR decomposition of the blocks $Y_{kk}$ may be given by the following Equation (11).

$$Q_{kk}, Y_{kk} \leftarrow Q_{kk}, R_{kk} = qr(Y_{kk}) \quad (11)$$

wherein $R_{kk}$ denotes an upper triangular factor. As set forth in Equation (9), computing the QR decomposition of the block $Y_{kk}$ may include updating the block $Y_{kk}$ with the upper triangular factor $R_{kk}$.

At 456, the malware detection controller 110 may update the blocks of the matrix that are to the right of the blocks on the diagonal of the matrix. The blocks $Y_{kj}$ may be on the right of the blocks $Y_{kk}$ along the diagonal of the matrix Y. These blocks may be updated using the orthonormal matrix $Q_{kk}$ in accordance with the following Equation (12).

$$Y_{kj} = Q_{kk}^T Y_{kj} \quad (12)$$

At 458, the malware detection controller 110 may compute a QR decomposition of each block that is beneath the blocks on the diagonal of the matrix. The blocks $Y_{ik}$ may be below the blocks $Y_{kk}$ along the diagonal of the matrix Y. The malware detection controller 110 may compute the QR decomposition of these blocks in accordance with the following Equation (12). As set forth in Equation (13), the QR decomposition of a block $Y_{ik}$ may be determined based on both the $Y_{ik}$ and the corresponding block $Y_{kk}$ that is on the diagonal of the matrix Y.

$$Q_{ik}, \begin{bmatrix} Y_{kk} \\ Y_{ik} \end{bmatrix} \leftarrow Q_{ik}, R_{ik} = qr\left( \begin{bmatrix} Y_{kk} \\ Y_{ik} \end{bmatrix} \right) \quad (13)$$

At 460, the malware detection controller 110 may update the blocks of the matrix that are to the right of the blocks beneath the diagonal of the matrix. The blocks $Y_{ij}$ may be on the right of the blocks $Y_{ik}$, which in turn may be below the blocks $Y_{kk}$ that lie along the diagonal of the matrix Y. The malware detection controller 110 may update these blocks using the projection matrix $Q_{ik}$ in accordance with the following Equation (14).

$$\begin{bmatrix} Y_{kj} \\ Y_{ij} \end{bmatrix} = Q_{kk}^T \begin{bmatrix} Y_{kj} \\ Y_{ij} \end{bmatrix} \quad (14)$$

Table 1 below depicts pseudo program code implementing the process 450 for out-of-core matrix decomposition.

TABLE 1

1: Data Matrix $A \in \mathbb{R}^{M \times N}$ split into R × C blocks or tiles.
2: Result Matrix A has been transformed into $R \in \mathbb{R}^{M \times N}$ from a QR factorization.
3: for Blocks $A_{kk}$ along the diagonal do
4:    Compute the QR Decomposition
      $Q_{kk}, A_{kk} \leftarrow Q_{kk}, R_{kk} = qr(A_{kk})$
   updating $A_{kk}$ with the upper triangular factor $R_{kk}$.

TABLE 1-continued

```
 5:    for Blocks A_kj to the right of A_kk do
 6:        Use the projection matrix Q_kk to update
                   A_kj = Q_kk^T A_kj
 7:    end for
 8:    for Blocks A_ik below A_kk do
 9:        Compute the QR Decomposition with "coupling"
```

$$Q_{ik}, \begin{bmatrix} A_{kk} \\ A_{ik} \end{bmatrix} \leftarrow Q_{ik}, R_{ik} = qr\left(\begin{bmatrix} A_{kk} \\ A_{ik} \end{bmatrix}\right)$$

```
10:        for Blocks A_ij to the right of A_ik do
11:            Use the projection matrix Q_ik to update
```

$$\begin{bmatrix} A_{kj} \\ A_{ij} \end{bmatrix} = Q_{kk}^T \begin{bmatrix} A_{kj} \\ A_{ij} \end{bmatrix}$$

```
12:        end for
13:    end for
14: end for
```

Figure 5:
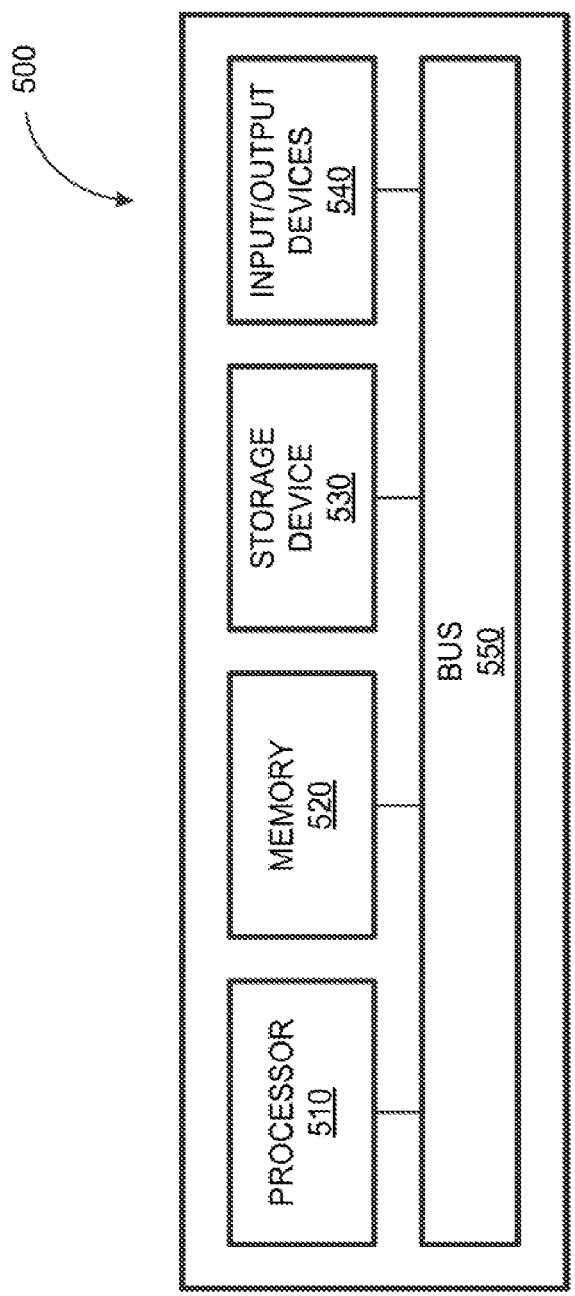
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1, 3, and 5, the computing system 500 can be used to implement the malware detection controller 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the allocation engine 140. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various format. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
    determining a sketch matrix that approximates a matrix representative of a reference dataset, the reference dataset including at least one computer program having a predetermined classification;
    determining, based on the sketch matrix, an orthonormal approximation of a range of the reference dataset;
    determining, based on the determined orthonormal approximation of the range of the reference dataset, an approximation of an intermediate dimensional feature space occupied by the reference dataset;
    determining, based on the intermediate dimensional feature space, an approximation of a basis of a feature space occupied by the reference dataset;
    generating, based on the basis of the feature space occupied by the reference dataset a reduced dimension representation of the reference dataset, the reduced dimension representation having a fewer quantity of features than the reference dataset; and
    classifying, based at least on the reduced dimension representation, a target computer program to determine whether the target computer program is malicious.

2. The computer-implemented method of claim 1, wherein the sketch matrix is determined by at least applying, to the matrix representative of the reference dataset, a sketch operator.

3. The computer-implemented method of claim 2, wherein the sketch operator comprises multiplying the matrix representative of the reference dataset with a random projection matrix, the random projection matrix being populated with one or more values selected from a normal distribution of values.

4. The computer-implemented method of claim 2, wherein the sketch operator implements a feature hashing function.

5. The computer-implemented method of claim 2, wherein the sketch operator implements a Monte Carlo sampling function.

6. The computer-implemented method of claim 5, wherein the determining of the sketch matrix comprises:
    loading, into a main memory, a first portion of the matrix representative of the reference dataset;
    computing a partial product of the other matrix and the matrix representative of the reference dataset before loading, into the main memory, a second portion of the matrix representative of the reference dataset.

7. The computer-implemented method of claim 6, wherein at least some of the features in reference dataset are merged to generate the reduced dimension representation of the reference dataset.

8. The computer-implemented method of claim 7, wherein the classifying of the target computer program comprises determining, based on the reduced dimension representation of the reference dataset, a measure of similarity between the target computer program and the reference dataset.

9. The computer-implemented method of claim 8, wherein the classifying of the target computer program comprises determining, based on the measure of similarity, whether the target computer program should be assigned a same classification as the one or more computer programs in the reference dataset.

10. The computer-implemented method of claim 9, wherein the predetermined classification comprises malicious, benign, a family of malware, and/or a type of malware.

11. The computer-implemented method of claim 10, wherein the features in the reference dataset include a file path, a file size, a file type, an instruction sequence, a character string, a binary string, a code complexity measurement, an anomalous behavior, a deceptive behavior, a destructive behavior, a data loss capability, and/or a data collection capability.

12. A system, comprising:
    at least one data processor; and
    at least one memory storing instructions which, when executed by the at least one data processor, result in operations comprising:
        determining a sketch matrix that approximates a matrix representative of a reference dataset, the reference dataset including at least one computer program having a predetermined classification;
        determining, based on the sketch matrix, an orthonormal approximation of a range of the reference dataset;
        determining, based on the determined orthonormal approximation of the range of the reference dataset, an approximation of an intermediate dimensional feature space occupied by the reference dataset;
        determining, based on the intermediate dimensional feature space, an approximation of a basis of a feature space occupied by the reference dataset;
        generating, based on the basis of the feature space occupied by the reference dataset a reduced dimension representation of the reference dataset, the reduced dimension representation having a fewer quantity of features than the reference dataset; and classifying, based at least on the reduced dimension representation, a target computer program to determine whether the target computer program is malicious.

13. A method for implementation by one or more computers comprising:
receiving data characterizing a target computer program;
classifying, based at least on a reduced dimension representation, the target computer program to determine whether the target computer program is malicious;
preventing execution or access of the target computer program based on a determination that the target computer program is malicious; or
allowing execution or access of the target computer program based on a determination that the target computer program is not malicious;
wherein the reduced dimension representation is generated by:
determining a sketch matrix that approximates a matrix representative of a reference dataset, the reference dataset characterizing a plurality of computer programs having a predetermined classification indicating whether each such computer program is malicious or benign; and
determining, based on the sketch matrix, an orthonormal approximation of a range of the reference dataset;
determining, based on the determined orthonormal approximation of the range of the reference dataset, an approximation of an intermediate dimensional feature space occupied by the reference dataset;
determining, based on the intermediate dimensional feature space, an approximation of a basis of a feature space occupied by the reference dataset; and
generating, based on the basis of the feature space occupied by the reference dataset a reduced dimension representation of the reference dataset, the reduced dimension representation having a fewer quantity of features than the reference dataset.

14. The computer-implemented method of claim 13, wherein the sketch matrix is determined by at least applying, to the matrix representative of the reference dataset, a sketch operator.

15. The computer-implemented method of claim 14, wherein the sketch operator comprises multiplying the matrix representative of the reference dataset with a random projection matrix, the random projection matrix being populated with one or more values selected from a normal distribution of values.

16. The computer-implemented method of claim 14, wherein the sketch operator implements a feature hashing function.

17. The computer-implemented method of claim 14, wherein the sketch operator implements a Monte Carlo sampling function.

18. The computer-implemented method of claim 17, wherein the determining of the sketch matrix comprises:
loading, into a main memory, a first portion of the matrix representative of the reference dataset;
computing a partial product of the other matrix and the matrix representative of the reference dataset before loading, into the main memory, a second portion of the matrix representative of the reference dataset.

19. The computer-implemented method of claim 13, wherein the predetermined classification comprises malicious, benign, a family of malware, and/or a type of malware.

20. The computer-implemented method of claim 19, wherein features in the reference dataset include a file path, a file size, a file type, an instruction sequence, a character string, a binary string, a code complexity measurement, an anomalous behavior, a deceptive behavior, a destructive behavior, a data loss capability, and/or a data collection capability.

* * * * *